United States Patent
Dabertrand et al.

(10) Patent No.: US 6,446,765 B1
(45) Date of Patent: Sep. 10, 2002

(54) DEVICE FOR FIXING A VENTILATED BRAKE DISK AXIALLY ON THE HUB OF A MOTOR VEHICLE WHEEL

(75) Inventors: Pierre Dabertrand, Saint Marcel; Didier Clement, Lyons, both of (FR)

(73) Assignee: Messier-Bugatti, Velizy-Villacoublay (FR)

( * ) Notice: Subject to any disclaimer, the term of this patent is extended or adjusted under 35 U.S.C. 154(b) by 0 days.

(21) Appl. No.: 09/680,762

(22) Filed: Oct. 6, 2000

(30) Foreign Application Priority Data

Oct. 8, 1999 (FR) .............................. 99 12561

(51) Int. Cl.[7] .................. B60T 1/06; F16D 55/02
(52) U.S. Cl. ................ 188/18 A; 188/218 XL; 188/71.6; 188/264 R
(58) Field of Search ............................ 188/17, 18 A, 188/218 XL, 264 R, 18 R, 71.6; 301/6.1, 6.3, 6.8, 105.1

(56) References Cited

U.S. PATENT DOCUMENTS

| | | | | |
|---|---|---|---|---|
| 4,108,286 A | * | 8/1978 | Gagarin | 188/218 XL |
| 4,815,572 A | * | 3/1989 | Froberg et al. | 188/251 M |
| 4,825,981 A | * | 5/1989 | Otto et al. | 188/218 XL |
| 5,224,572 A | | 7/1993 | Smolen, Jr. et al. | |
| 6,035,978 A | * | 3/2000 | Metzen et al. | 188/218 XL |

FOREIGN PATENT DOCUMENTS

| | | | | |
|---|---|---|---|---|
| DE | 29823521 | | 7/1993 | |
| EP | 0 198 217 A1 | * | 10/1986 | 188/218 X |

* cited by examiner

Primary Examiner—Jack Lavinder
Assistant Examiner—Thomas J. Williams
(74) Attorney, Agent, or Firm—Weingarten, Schurgin, Gagnebin & Lebovici LLP

(57) ABSTRACT

An axial fixing device for axially fixing an annular brake disk on a wheel hub of a motor vehicle, the annular brake disk having the same axis of rotation as the hub and including radial ventilation ducts regularly distributed about its periphery. According to the invention, the hub has axial guide pieces in relief, or "lugs", for co-operating with fluting in an inner peripheral edge of the disk to center the disk, to lock it angularly, and to guide it axially relative to the hub, each lug of the hub having a radial through channel for co-operating with a corresponding ventilation duct of the disk, and the disk is held axially in the hub with play by axial holding means disposed between the disk and the hub.

10 Claims, 4 Drawing Sheets

DEVICE FOR FIXING A VENTILATED BRAKE DISK AXIALLY ON THE HUB OF A MOTOR VEHICLE WHEEL

TECHNICAL FIELD

An axial fixing device for axially fixing an annular brake disk on a wheel hub of a motor vehicle, the annular brake disk having the same axis of rotation as the hub and including radial ventilation ducts regularly distributed about its periphery. According to the invention, the hub has axial guide pieces in relief, or "lugs", for co-operating with fluting in an inner peripheral edge of the disk to center the disk, to lock it angularly, and to guide it axially relative to the hub, each lug of the hub having a radial through channel for co-operating with a corresponding ventilation duct of the disk, and the disk is held axially in the hub with play by axial holding devices disposed between the disk and the hub.

PRIOR ART

In a motor vehicle, a brake disk is mounted on the hub of a wheel, or more generally on a bell-shaped intermediate metal part referred to as a "bowl" which is itself fixed to the hub. To simplify the description below, the term "hub" is used on its own.

To connect the disk to the hub, either a fixed mount is used, or a floating mount is used.

In a fixed mount, the disk cannot move axially under thrust from the hydraulic pistons acting via the brake pads. A fixed mount suffers from numerous drawbacks, including warping of the disk due to differential expansion between the disk and the hub. This warping causes the pads to lift off the disk and constrains the driver of the motor vehicle to "pump" on the brake pedal in order to bring them back into contact with the disk.

In a floating mount, as is commonly used with disks made of composite materials, the disk can move axially through a few tenths of a millimeter, thus in particular, avoiding any risk of warping.

Nevertheless, both types of mount suffer from numerous defects that restrict potential use. These comprise essentially the large number of parts necessary for transmitting the braking torque, thus giving rise to high mass and cost, and also problems associated with assembling and disassembling the brake disk and the large amount of space occupied laterally by both of those types of prior art mount.

OBJECT AND DEFINITION OF THE INVENTION

Thus, the present invention seeks to remedy those drawbacks by means of an axial fixing device which holds the disk axially with an accurately controlled amount of play. An object of the invention is also to propose a device which can be implemented with ventilated brake disks so as to make high speed uses possible. Another object of the invention is to make a device that is simple to assemble and low in weight.

These objects are achieved by an axial fixing device for axially fixing an annular brake disk on a wheel hub of a motor vehicle, the annular brake disk having the same axis of rotation as the hub and including radial ventilation ducts regularly distributed about its periphery, wherein said hub has axial guide pieces in relief, or "lugs", for co-operating with fluting in an inner peripheral edge of the disk to center the disk, to lock it angularly, and to guide it axially relative to the hub, each lug of the hub having a radial through channel for co-operating with a corresponding ventilation duct of the disk, and wherein the disk is held axially in the hub with play by axial holding means disposed between the disk and the hub.

In a first embodiment, said axial holding means comprise a plurality of radial pegs, each peg being engaged firstly in a radial through channel of a lug of the hub and secondly in a radial ventilation duct facing it in the brake disk. Advantageously, the radial through channel of the lug has a diameter that is slightly greater than that of the peg so as to provide a small amount of axial play in the range 0.2 mm to 0.4 mm. Preferably, the axial holding means includes at least one peg with a radial through bore to avoid impeding internal ventilation of the disk. It further includes locking means for holding the peg in position during rotation of the wheel and thus prevent it moving radially. Said locking means may comprise a stop plate fixed on a distal face of the lug and designed to co-operate with a groove in the peg.

In a second embodiment, said axial holding means comprises at least one tab fixed on a distal face of a lug of the hub and designed to co-operate with a slot perpendicular to the common axis and formed in each of the two adjacent pieces in relief of the inner peripheral edge of the disk. Said lug of the hub further includes a groove perpendicular to the common axis and formed in line with the slot to receive the tab. Advantageously, the groove is slightly wider than the slot so as to provide a small amount of axial play in the range 0.2 mm to 0.4 mm.

The brake disk is made of a carbon/carbon composite material.

BRIEF DESCRIPTION OF THE DRAWINGS

The invention will be better understood on reading the following description of a particular embodiment. Reference is made to the accompanying drawings, in which.

DESCRIPTION OF A PREFERRED EMBODIMENT

Figure 1:
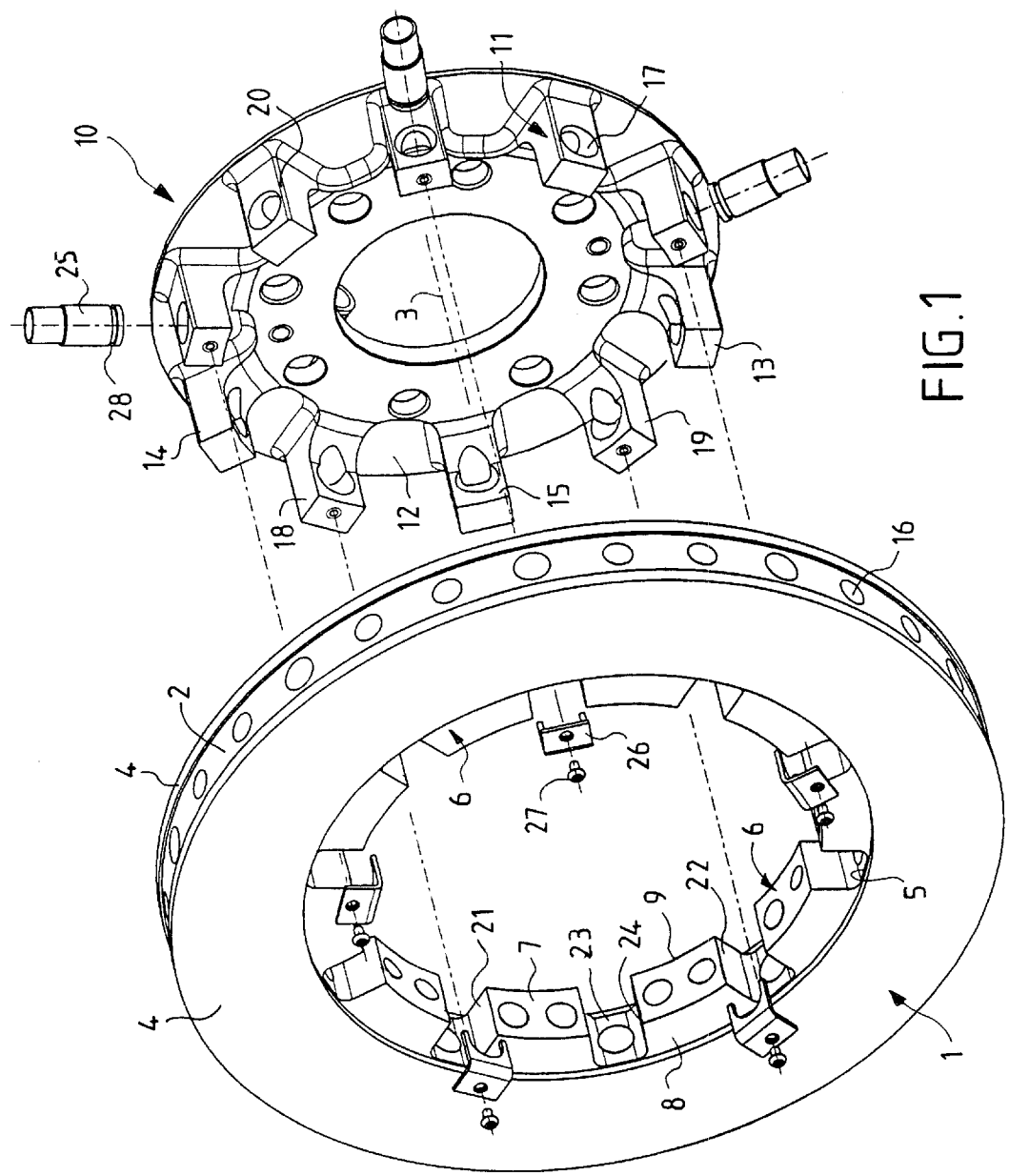
FIG. 1 is a partially exploded perspective view of a ventilated brake disk mounted on a wheel hub in a first embodiment of the invention.

FIG. 1 is a perspective view of a ventilated brake disk 1 comprising a central body 2 of annular shape and having an axis of rotation 3, with brake linings 4 mounted on the two opposite faces thereof. Projecting radially from an inner peripheral edge 5, this annular brake disk has a plurality of spaced-apart guide pieces 6 in relief that are substantially rectangular in shape, each having a proximal face in contact with the inner peripheral edge 5, an opposite distal face 7, and outer peripheral faces 8 and 9 respectively in the same planes as the two outer faces of the body 2 carrying the linings 4. The annular brake disk 1 is mounted on a wheel hub or bowl 10 represented for simplification purposes as being in the form of an annular disk whose axis 3 is common with the axis of the brake disk 1 and which has a plurality of spaced-apart guide pieces in relief or "lugs" 11 that project axially and that are substantially rectangular in shape, each having a proximal face in contact with an inner face 12 of the disk, an opposite distal face 13 and outer and inner peripheral faces 14 and 15 facing respectively towards the outside and the inside of the disk. Together the outer and inner peripheral faces of the lugs 11 define respectively an outer peripheral edge and an inner peripheral edge that are both generally cylindrical in shape for the wheel hub 10.

In applications to cars, in particular top-of-range private cars and sports cars, the annular brake disk is generally made entirely (body and linings) out of a composite material having good thermal and mechanical characteristics, such as a carbon/carbon (C/C) composite, and it has a plurality of radial ventilation ducts 16 that are open at both ends and that serve to cool it by means of ambient air. These ventilation ducts formed radially through the body 2 of the annular disk are distributed regularly around its circumference and open out both to its outer peripheral and to an annular space between its inner peripheral edge 5 and the wheel axle (not shown) carrying the hub 10. Similarly, each lug 11 of the hub includes a radial channel 17 that is open at both ends and that is likewise designed to participate in cooling the disk when the disk is mounted on its hub.

Each lug 11 of the hub has two flanks 18, 19 that are parallel and symmetrical about a midplane containing the axis 3, and united with the outer peripheral face 14 via two curves or a chamfer 20 to avoid shearing the lug and to increase contact area when it is compressed during braking. For the purpose of angularly locking and centering the brake disk 1 relative to the hub 10, the lugs 11 co-operate with the corresponding guide pieces 6 in relief on the inner peripheral edge 5 of the disk. These pieces 6 in relief also have radial ducts 16 passing through them and they have flanks 21 and 22 respectively parallel to the flanks 18 and 19 of the hub which are contiguous to them. This leaves the disk 1 and the hub 10 free to expand radially without jamming relative to each other, since the pieces 6 in relief are separated by fluting 23 of depth greater than the engagement height of the lugs 11 so as to compensate for differential expansion of the disk and the hub, and into each of which one of the radial ducts 16 opens out. The bottom of the fluting is likewise rounded with curvature of large radius 24 in order to reduce stress concentration.

Sufficient play is also provided between the flanks 18, 19 of the hub and the flanks 21, 22 of the disk to make it easy to mount the disk on the hub, while nevertheless not so large as to run the risk of hammering. In the assembly position, the radial ducts 16 of the disk open out into the corresponding fluting 23 exactly in correspondence with the radial through channels 17 of the hub lugs. Advantageously, the lugs 11 and the guide pieces 6 in relief associated therewith are ten in number, but that number is not limiting.

Figure 2:
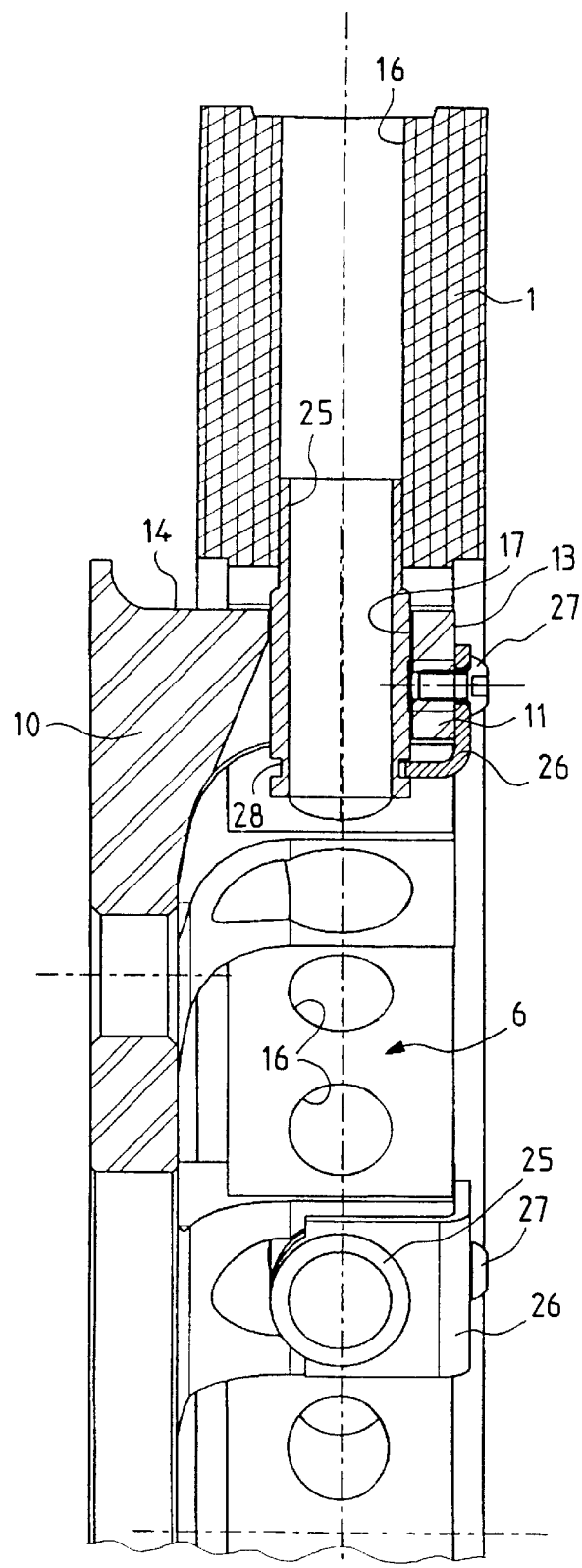
FIG. 2 is a cross-section view of the FIG. 1 brake assembly.

In a preferred first embodiment, and as shown in FIG. 2, the axial connection between the hub 10 and the annular disk 1 is provided by radial pegs 25, there being at least three such pegs that are angularly distributed, with each peg being engaged firstly with a small amount of play in the range 0.2 mm to 0.4 mm in a radial through channel 17 of a lug 11 and also with an exact fit in the radial ventilation duct 16 of the brake disk facing it. By passing in this way through both the hub and the disk, axial fixing is achieved with accurately controlled play. A stop plate 26 fixed (e.g. by means of a screw 27) in the distal face 13 of the lug co-operates with a groove 28 of the peg so as to keep it in position and prevent it from moving radially or being ejected under the effect of inertial forces, or more simply under the effect of vibration. Naturally, the invention is not limited to this particular solution and the stop plate 26 could be replaced by any other analogous locking means, e.g. a screw braked by a steel wire. The peg 25 has a through hole so as to avoid impeding internal ventilation of the disk, thereby retaining the architecture specific to this type of disk. It will be observed that this part is easy to obtain by machining or by any other means.

Figure 3:
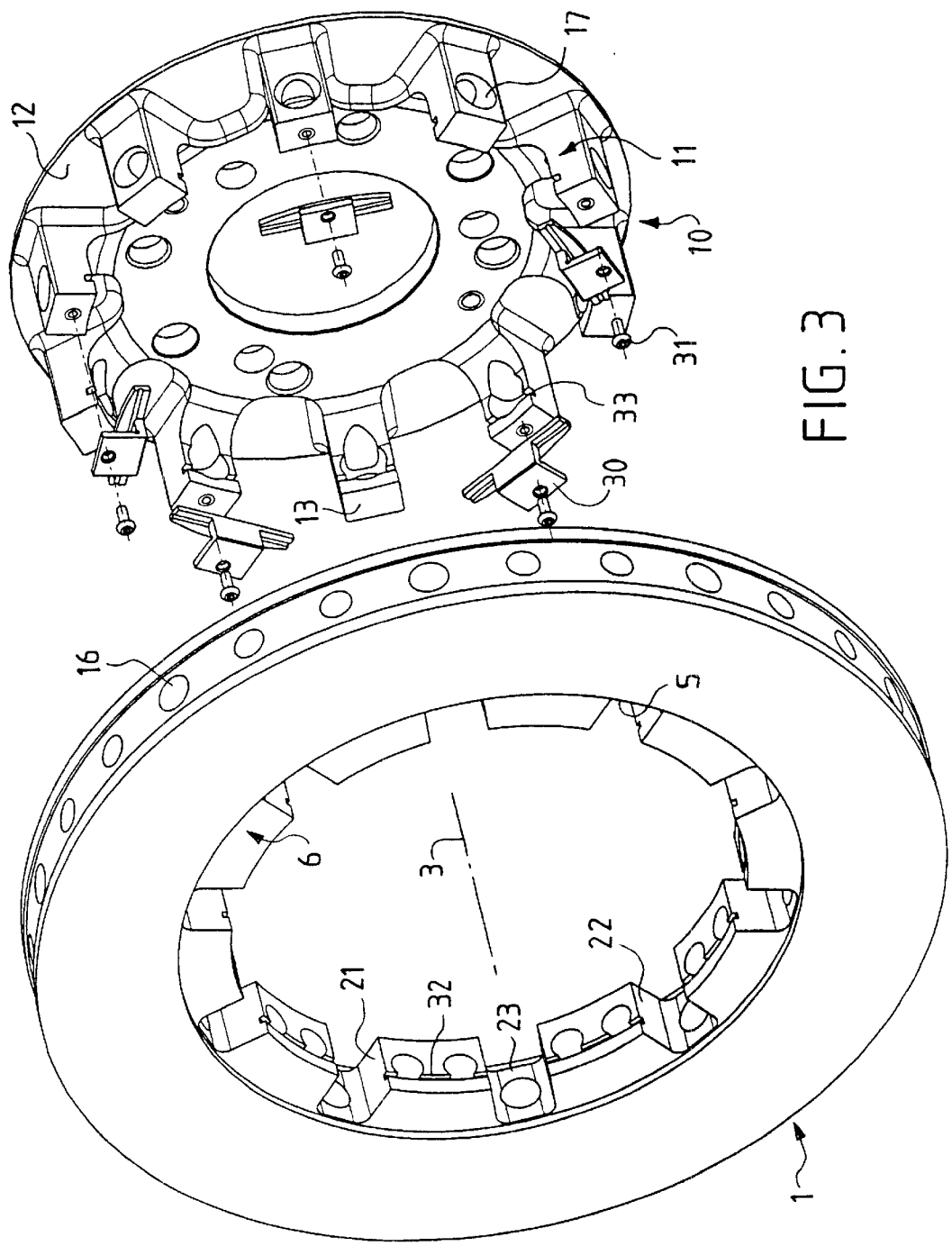
FIG. 3 is a partially exploded prospective view of a brake disk mounted on a wheel hub in a second embodiment of the invention.
Figure 4:
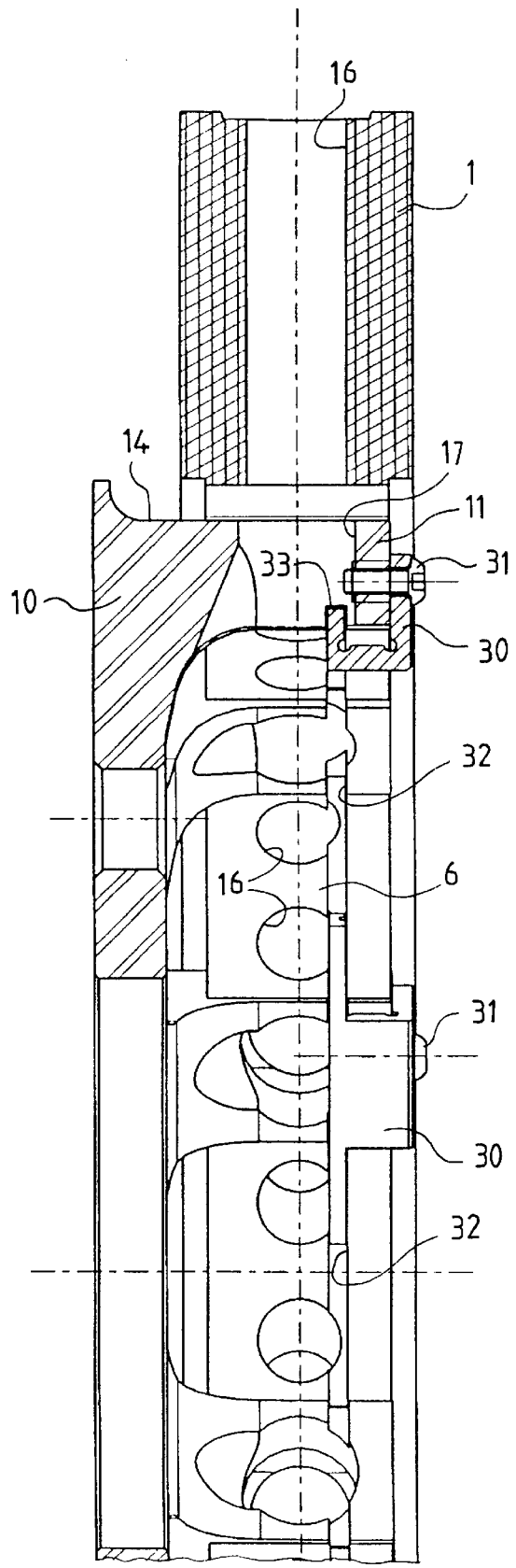
FIG. 4 is a cross-section view of the FIG. 3 brake assembly.

In a second embodiment, as shown in FIGS. 3 and 4, the axial connection between the hub 10 and the annular brake disk 1 can also be provided by at least three tabs 30 each fixed (e.g. by means of the screw 31) in the distal face 13 of a lug of the hub and having a free portion that co-operates with a slot 32 formed perpendicularly to the axis 3 in each of the two adjacent pieces 6 in relief of the inner peripheral edge 5 of the disk so as to hold the disk axially in order to avoid residual friction between the disk and the brake pads and so as to avoid problems of the pads lifting off the disk due to the disk moving at high speed. The lug 11 has a groove 33 that is likewise perpendicular to the axis 3 and located in line with the slot 32 in order to receive the free portion of the tab 30. This groove is slightly wider than the slot so as to provide a small amount of play of the order in the range 0.2 mm to 0.4 mm.

The materials used in the device of the invention (for making the pegs, the tabs, and the stop plates) are preferably surface-treated aluminum alloys or titanium alloys (of the Ti Al 6 Va type).

Thus, in the invention, an axial fixing device is provided that makes it quick and easy to mount and dismount the disk while reducing the number of parts (and thus the cost). In addition, it is easier to manufacture and to use.

What is claimed is:

1. An axial fixing device for axially fixing an annular brake disk on a wheel hub of a motor vehicle, the annular brake disk having the same axis of rotation as the hub and including radial ventilation ducts open at both ends and regularly distributed about its periphery, wherein said hub has axial guide pieces in relief, or "lugs", for co-operating with fluting in an inner peripheral edge of the disk to center the disk, to lock it angularly, and to guide it axially relative to the hub, which transmit the braking torque of the disk, having a radial through channel for co-operating with a corresponding ventilation duct of the disk, and wherein the disk is held axially in the hub with play by axial holding means disposed between the disk and the hub, said axial holding means comprises a plurality of radial pegs, each peg being engaged firstly in the radial through channel of the lug of the hub and secondly in the radial ventilation duct facing it in the brake disk.

2. The axial fixing device according to claim 1, wherein the radial through channel of the lug has a diameter that is slightly greater than that of the peg so as to provide a small amount of axial play in the range 0.2 mm to 0.4 mm.

3. The axial fixing device according to claim 1, including at least one peg with a radial throughtore to avoid impeding internal ventilation of the disk.

4. The axial fixing device according to claim 1, further including locking means for holding the peg in position during rotation of the wheel and thus prevent it moving radially.

5. An axial fixing device according to claim 4, wherein said locking means comprises a stop plate fixed on a distal face of the lug and designed to co-operate with a groove in the peg.

6. An axial fixing device according to claim 1, wherein the brake disk is made of a carbon/carbon composite material.

7. An axial fixing device for axially fixing an annular brake disk on a wheel hub of a motor vehicle, the annular brake disk having the same axis of rotation as the hub and including radial ventilation ducts open at both ends and regularly distributed about its periphery, wherein said hub has axial guide pieces in relief, or "lugs", for co-operating with fluting in an inner peripheral edge of the disk to center the disk, to lock it angularly, and to guide it axially relative to the hub, each lug of the hub, which transmit the braking torque of the disk, having a radial through channel for co-operating with a corresponding ventilation duct of the disk, and wherein the disk is held axially in the hub with play by axial holding means disposed between the disk and the hub, said axial holding means comprises at least one tab fixed on a distal face of the lug of the hub and designed to cooperate with a slot perpendicular to the common axis and formed in each of the two adjacent pieces in relief of the inner peripheral edge of the disk.

8. An axial fixing device according to claim 7, wherein said lug of the hub further includes a groove perpendicular to the common axis and formed in line with the slot to receive the tab.

9. An axial fixing device according to claim 8, wherein the groove is slightly wider than the slot so as to provide a small amount of axial play in the range 0.2 mm to 0.4 mm.

10. The axial fixing device according to claim 7, whereon the brake disk is made of a carbon/carbon composite.

\* \* \* \* \*